(12) United States Patent
Lu et al.

(10) Patent No.: US 11,010,530 B2
(45) Date of Patent: May 18, 2021

(54) METHOD AND APPARATUS FOR DESIGNING RESISTIVE RANDOM ACCESS MEMORY

(71) Applicant: THE INSTITUTE OF MICROELECTRONICS OF CHINESE ACADEMY OF SCIENCES, Beijing (CN)

(72) Inventors: Nianduan Lu, Beijing (CN); Ling Li, Beijing (CN); Ming Liu, Beijing (CN); Qi Liu, Beijing (CN)

( * ) Notice: Subject to any disclaimer, the term of this patent is extended or adjusted under 35 U.S.C. 154(b) by 0 days.

(21) Appl. No.: 16/647,027

(22) PCT Filed: Aug. 9, 2018

(86) PCT No.: PCT/CN2018/099639
§ 371 (c)(1),
(2) Date: Mar. 13, 2020

(87) PCT Pub. No.: WO2019/223122
PCT Pub. Date: Nov. 28, 2019

(65) Prior Publication Data
US 2020/0257845 A1     Aug. 13, 2020

(30) Foreign Application Priority Data

May 24, 2018 (CN) .......................... 201810508704.8

(51) Int. Cl.
*G06F 30/398* (2020.01)
*G06F 16/903* (2019.01)
(Continued)

(52) U.S. Cl.
CPC ...... *G06F 30/398* (2020.01); *G06F 16/90335* (2019.01); *G06F 2113/26* (2020.01); *H01L 45/08* (2013.01)

(58) Field of Classification Search
CPC ............... H01L 45/08; G06F 16/90335; G06F 2113/26; G06F 30/398
See application file for complete search history.

(56) References Cited

U.S. PATENT DOCUMENTS

2012/0197810 A1   8/2012   Haarmann
2014/0117303 A1*  5/2014   Wang .................... H01L 45/16
                                                          257/4
(Continued)

FOREIGN PATENT DOCUMENTS

CN        101763452 A      6/2010
CN        104409632 A      3/2015
(Continued)

OTHER PUBLICATIONS

International search report of PCT/CN2018/099639.
(Continued)

*Primary Examiner* — Vuthe Siek

(57) ABSTRACT

The disclosure provides a method and apparatus for designing a resistive random access memory, and the method comprise: receiving a preset first parameter standard of a resistive switching material, searching for and outputting a first resistive switching material based on the first parameter standard, first parameters including: band gap, charge transfer, vacancy, migration barrier, carrier activation energy, Schottky barrier and number of mesophase: establishing a resistive switching material database according to the first resistive switching materials; receiving a second parameter standard for a resistive random access memory device model, and selecting a second resistive switching material from the resistive switching material database according to the second parameter standard, second parameters including: Forming voltage, SET voltage, RESET voltage, erasing and writing speed, power consumption, storage window, stability, durability, on-off ratio, fluctuation of current (Continued)

```
receiving a preset first parameter standard for a resistive switching material, and     S110
searching for and outputting a first resistive switching material by using a high-
throughput first-principles calculations method based on the first parameter standard establishing a resistive switching material database according to the first resistive   S111
                          switching materials receiving a second parameter standard for a resistive random access memory device       S112
model, and selecting a second resistive switching material from the resistive switching
        material database according to the second parameter standard designing a resistive random access memory by using the second resistive switching      S113
  material, corresponding electrode material, and a predetermined storage structure
``` parameter and storage density of the device model; and designing a resistive random access memory by using the second resistive switching material, corresponding electrode material, and a predetermined storage structure.

8 Claims, 2 Drawing Sheets

(51) Int. Cl.
    *G06F 113/26*     (2020.01)
    *H01L 45/00*     (2006.01)

(56) References Cited

U.S. PATENT DOCUMENTS

2016/0049604 A1* 2/2016 Cai ............... H01L 51/0591
                                                                                     257/4
2016/0366402 A1* 12/2016 Myers ............... H04N 17/002
2019/0087525 A1* 3/2019 Gabay ............... G06F 30/392

FOREIGN PATENT DOCUMENTS

| CN | 107180147 A | 9/2017 |
| CN | 107368952 A | 11/2017 |

OTHER PUBLICATIONS

Research on Novel High-Density Nonvolatile Memories Author: Yuan Fang ISSN:1674-022X Date: Jan. 5-15, 2016 Publisher:Electronic Technology&Information Science, China Doctoral Dissertation Full-Text Database.
First Office Action of CNIPA.

* cited by examiner receiving a preset first parameter standard for a resistive switching material, and searching for and outputting a first resistive switching material by using a high-throughput first-principles calculations method based on the first parameter standard — S110 establishing a resistive switching material database according to the first resistive switching materials — S111 receiving a second parameter standard for a resistive random access memory device model, and selecting a second resistive switching material from the resistive switching material database according to the second parameter standard — S112 designing a resistive random access memory by using the second resistive switching material, corresponding electrode material, and a predetermined storage structure — S113

FIG. 1

METHOD AND APPARATUS FOR DESIGNING RESISTIVE RANDOM ACCESS MEMORY

TECHNICAL FIELD

The present disclosure belongs to the technical field of semiconductor memory devices, and in particular, to a method and an apparatus for designing a resistive random access memory.

BACKGROUND OF THE INVENTION

With the rapid development of technologies such as big data, cloud computing, and Internet of Things, the data that need to be stored and processed in the world are increasingly growing, and better-performing memories are needed to meet the requirements of rapidly developing information technology for ultra-high-density storage.

Resistive random access memories (RRAMs) have become popular to users due to their low operating power consumption, long durability, simple structure, and small device area. However, due to wide varieties of materials for resistive random access memory, the factors affecting the characteristics of resistive random access memory are diversified. At present, when designing resistive random access memory, current experimental means and theoretical methods cannot fully consider the factors affecting the characteristics of resistive random access memory, resulting in that the overall performance of the resistive random access memory cannot be guaranteed.

SUMMARY OF THE INVENTION

In view of the problems existing in the prior art, embodiments of the present disclosure provide a method and apparatus for designing a resistive random access memory for solving the problem in the prior art that the characteristics of the resistive random access memory cannot be fully considered when designing the resistive random access memory and the overall performance of the resistive random access memory cannot be unguaranteed.

The disclosure provides a method for designing a resistive random access memory, and the method may comprise:

receiving a preset first parameter standard for a resistive switching material, and searching for and outputting a first resistive switching material by using a high-throughput first-principles calculations method based on the first parameter standard, wherein first parameters include: band gap, charge transfer, vacancy, migration barrier, carrier activation energy, Schottky barrier and number of mesophase;

establishing a resistive switching material database according to the first resistive switching materials;

receiving a second parameter standard of a resistive random access memory device model, and selecting a second resistive switching material from the resistive switching material database according to the second parameter standard, wherein the resistive random access memory device models are established based on the first resistive switching materials in the resistive switching material database; and second parameters include: Forming voltage, SET voltage, RESET voltage, erasing and writing speed, power consumption, storage window, stability, durability, on-off ratio, fluctuation of current parameter and storage density of the device models; and designing a resistive random access memory by using the second resistive switching material, corresponding electrode material, and a predetermined storage structure.

In some embodiments, the first parameter standard includes: band gap: 1~4 eV, charge transfer: less than 0.5 eV, vacancy: with oxygen vacancy and gap, migration barrier: less than 1 eV, carrier activation energy: less than 1 eV, Schottky barrier: less than 2 eV, and number of mesophase: less than 3 types.

In some embodiments, the establishing the resistive switching material database according to the first resistive switching materials includes:

establishing mapping tables between various first resistive switching materials and corresponding first parameter standards; and storing respectively the mapping tables in corresponding data blocks in a preset database to form the resistive switching material database.

In some embodiments, the second parameter standard may include: for the device model, Forming voltage: less than 5 V; SET voltage: less than 3 V; RESET voltage: less than 3 V; erasing and writing speed: less than 500 ns; power consumption: no more than $10^{-6}$ pJ; storage window: greater than 10; retention characteristics: more than 1000 times; durability: working time greater than 10 years in 85° C. environment; on-off ratio: greater than 10; fluctuation of current parameter: greater than 80%; storage density: not less than 1.0 Gbit/cm$^2$.

In some embodiments, the selecting the second resistive switching material from the resistive switching material database according to the second parameter standard may comprise:

selecting the resistive random access memory device model conforming to the second parameter standard from a plurality of the resistive random access memory device models; and determining second resistive switching materials used in the selected resistive random access memory device models.

In some embodiments, after designing the resistive random access memory by using the second resistive switching material, corresponding electrode material, and the predetermined storage structure, the method may further comprise: verifying an overall performance of the resistive random access memory according to a preset verification standard.

The disclosure also provides an apparatus for designing a resistive random access memory, and the apparatus may comprise:

a searching unit, configured to receive a preset first parameter standard for a resistive switching material, and search for and output a first resistive switching material according to the first parameter standard, wherein first parameters include: band gap, charge transfer, vacancy, migration barrier, carrier activation energy, Schottky barrier and number of mesophase;

an establishing unit configured to establish a resistive switching material database according to the first resistive switching materials;

a selecting unit, configured to receive a second parameter standard for a resistive random access memory device model, and selecting a second resistive switching material from the resistive switching material database according to the second parameter standard, wherein the resistive random access memory device models are established based on the first resistive switching materials in the resistive switching material database; and second parameters include: Forming voltage, SET voltage, RESET voltage, erasing and writing speed, power consumption, storage window, stability, durability, on-off ratio, fluctuation of current parameter and storage density of the device models; and a designing unit, configured to design a resistive random access memory by using the second resistive switching material, corresponding electrode material, and a predetermined storage structure.

In some embodiments, the establishing unit is specifically configured to:

establish mapping tables between various first resistive switching materials and corresponding first parameter standards; and store respectively the mapping tables in corresponding data blocks in a preset database to form the resistive switching material database.

In some embodiments, the selecting unit is specifically configured to:

select the resistive random access memory device model conforming to the second parameter standard from a plurality of the resistive random access memory device models; and determine second resistive switching materials used in the selected resistive random access memory device models.

In some embodiments, the apparatus may further comprise:

a verifying unit specifically, configured to verify an overall performance of the resistive random access memory according to a preset verification standard, after the resistive random access memory is designed by using the second resistive switching material, corresponding electrode material, and the predetermined storage structure.

The disclosure provides a method and apparatus for designing a resistive random access memory. The method may comprise: receiving a preset first parameter standard for a resistive switching material, searching for and outputting a first resistive switching material by using a high-throughput first-principles calculations method based on the first parameter standard, and first parameters comprise: band gap, charge transfer, vacancy, migration barrier, carrier activation energy, Schottky barrier, and number of mesophase; establishing a resistive switching material database according to the first resistive switching materials; receiving a second parameter standard for a resistive random access memory device model, and selecting a second resistive switching material from the resistive switching material database according to the second parameter standard, wherein the resistive random access memory device models are established based on the first resistive switching materials in the resistive switching material database, and second parameters comprise: Forming voltage, SET voltage, RESET voltage, erasing and writing speed, power consumption, storage window, stability, durability, on-off ratio, fluctuation of current parameter and storage density of the device models; and designing a resistive random access memory by using the second resistive switching material, corresponding electrode material, and a predetermined storage structure. In this way, mass resistive switching materials are selected according to the first parameter standards to obtain the first resistive switching materials and establish the resistive switching material database; resistive switching materials can be selected from the resistive switching material database to establish the resistive random access memory device models; and a part of the resistive switching materials are screened out from the resistive switching material database by using the performance parameter (second parameter) feedback information of the resistive random access memory device models, then the remaining resistive switching materials in the resistive switching material database are the second resistive switching materials with superior performance. Because the first parameter standards and the second parameter standards consider all the factors affecting the properties of the resistive switching material and the resistive random access memory, the overall performance of the resistive random access memory designed by using the selected second resistive switching materials must be guaranteed.

BRIEF DESCRIPTION OF THE DRAWINGS

Various advantages and benefits of the invention will become apparent to those skilled in the art from reading the detailed description of the preferred embodiments of the invention. The drawings are only for the purpose of illustrating the preferred embodiments and are not to be construed as limiting the invention. Throughout the drawings, the same reference numerals are used to refer to the same components. In the drawings:

FIG. 1 is a schematic flow chart of a method for designing a resistive random access memory according to an embodiment of the present disclosure.

DETAILED DESCRIPTION OF THE INVENTION

Figure 2:
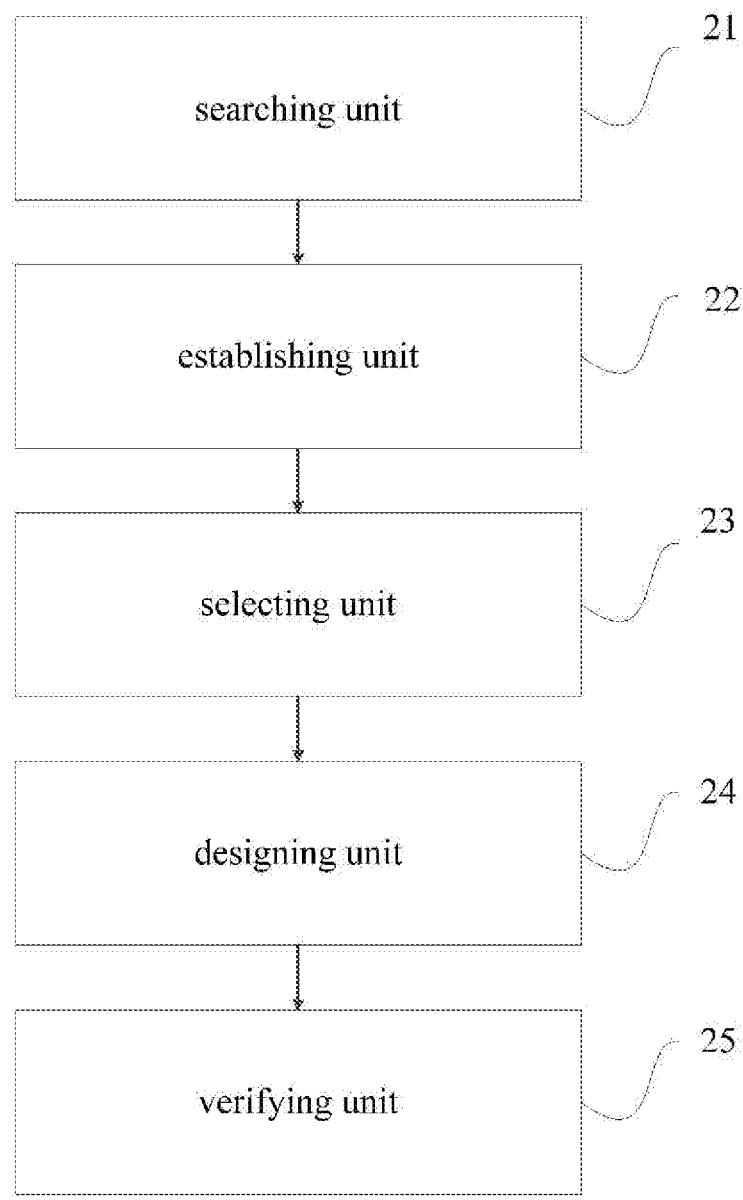
FIG. 2 is a schematic structural diagram of an apparatus for designing a resistive random access memory according to an embodiment of the present disclosure.

Exemplary embodiments of the present disclosure will be described in more detail below with reference to the accompanying drawings. While the embodiments of the present application have been shown in the drawings, it should be appreciated that these embodiments are not limiting, and the invention can be implemented in other forms. These embodiments are provided only for the purpose of fully understanding the invention and conveying the scope of the invention to those skilled in the art.

The technical solution of the present disclosure will be further described in detail below with specific embodiments in combination with accompanying drawings.

According to an embodiment of the disclosure, a method for designing a resistive random access memory is provided. As shown in FIG. 1, the method may comprise:

Step S110: receiving a preset first parameter standard for a resistive switching material, and searching for and outputting a first resistive switching material by using a high-throughput first-principles calculations method based on the first parameter standard.

When designing a resistive random access memory, the resistive switching material will affect the performance of the resistive random access memory. However, since there are various types of resistive switching materials, it will need great time if every resistive switching material is studied by experimental methods to determine a suitable resistive switching material. In this step, the first parameter standard for the resistive switching material is received by a high-throughput integrated automatic control system, and a first resistive switching material is searched for among mass materials by using the high-throughput first-principles calculations method based on the first parameter standard and then the first resistive switching material is outputted. The first resistive switching materials are resistive switching materials that meet the first parameter standard.

Here, the first-principles calculations method is to calculate first parameters of each of the materials that may be used as the materials of resistive random access memory respectively based on the first parameter standard, and if the calculated results meet the first parameter standard, the material is outputted as the first resistive switching material. The first parameters may mainly include: band gap, charge transfer, vacancy, migration barrier, carrier activation energy, Schottky barrier, and number of mesophase. Accordingly, the first parameter standard in this embodiment may include: band gap: 1~4 eV, charge transfer: less than 0.5 eV, vacancy: with oxygen vacancy and gap, migration barrier: less than 1 eV, carrier activation energy: less than 1 eV, Schottky barrier: less than 2 eV, number of mesophase: less than 3 types.

The method may further comprise: step S111, establishing a resistive switching material database according to the first resistive switching materials.

After the first resistive switching materials are obtained, since the first resistive switching materials also include a plurality of materials, a resistive switching material database can be established according to the first resistive switching materials, so that design procedures can be shortened for the research and development personnel when designing a resistive random access memory.

Here, firstly, mapping tables between respective first resistive switching materials and corresponding first parameter standards are established. For example, if a first resistive switching material A corresponds to the first parameters of: band gap: 2 eV, charge transfer: 0.3 eV, vacancy: with oxygen vacancy and gap, migration barrier: 0.8 eV, carrier activation energy: 0.9 eV, Schottky barrier: 1 eV, number of mesophase: 2 types, then a mapping table between the material A and these parameters can be established. The same procedures can be carried out for other first resistive switching materials, and finally a plurality of mapping tables can be established.

Then, the mapping tables can be respectively stored into corresponding data blocks in a preset database to form the resistive switching material database. That is to say, different data blocks store mapping tables of different first resistive switching materials and their corresponding first parameter standards, respectively. Of course, all the mapping tables can be stored in the same data region in the database, which is not limited herein.

The method may further comprise step S112: receiving a second parameter standard for a resistive random access memory device model, and selecting a second resistive switching material from the resistive switching material database according to the second parameter standard.

After the resistive switching material database is established, in order to find better resistive switching materials from the resistive switching material database, the second parameter standard for the resistive random access memory device model is received in this step, and then second resistive switching materials are selected from the resistive switching material database according to the second parameter standard. The resistive random access memory device models are established according to the first resistive switching materials in the resistive switching material database, and there are a plurality of resistive random access memory device models. That is, the first resistive switching materials are utilized to design a plurality of resistive random access memory device models. Thereafter, those resistive random access memory device models conforming to the second parameter standards can be selected from the plurality of resistive random access memory device models, and then the second resistive switching materials used in the selected resistive random access memory device models are determined.

In some embodiments, the performances of the plurality of resistive random access memory device models may be verified to obtain performance feedback information. The first resistive switching materials used in the resistive random access memory device models with better performances may be retained, and the first resistive switching materials used in the resistive random access memory device models with poor performances may be screened out. Finally, the remaining materials in the resistive switching material database are second resistive switching materials.

Here, the second parameters may include: Forming voltage, SET voltage, RESET voltage, erasing and writing speed, power consumption, storage window, stability, durability, on-off ratio, fluctuation of current parameter and storage density of the device model. Correspondingly, the second parameter standard may comprise: for the device model, Forming voltage: less than 5 V; SET voltage: less than 3 V; RESET voltage: less than 3 V; erasing and writing speed: less than 500 ns; power consumption: no more than $10^{-6}$ pJ; storage window: greater than 10; retention characteristics: more than 1000 times; durability: working time greater than 10 years in 85° C. environment; on-off ratio: greater than 10; fluctuation of current parameter: greater than 80%; storage density: not less than 1.0 Gbit/cm².

In some embodiments, the fluctuation of current parameter can be determined according to formula (1):

$$\Delta I = \frac{I_{max} - I_{min}}{I_{max}} \times 100\% \qquad (1)$$

In formula (1), $I_{max}$ represents the maximum current of the device model and $I_{min}$ represents the minimum current of the device model.

The method may further comprise step S113, designing the resistive random access memory by using the second resistive switching material, corresponding electrode material, and a predetermined storage structure.

After the second resistive switching materials are obtained, suitable electrode materials and storage structure can be determined to design the resistive random access memory. Here, a top electrode material for the resistive random access memory may include: a single-element electrode such as Ag, Cu, Ni, or an alloy electrode containing at least one of the foregoing elements; a bottom electrode material may include one or more of: TaN, TiN, W, Al, Ru, Ti and Pt. The storage structure may include a metal-insulator-metal structure or a metal-insulator-semiconductor structure.

After the resistive random access memory is designed, the overall performance of the resistive random access memory needs to be verified according to preset verification standards so as to determine a resistive random access memory meeting requirements and obtain performance feedback information. The performance feedback information may include electrostatic/electron memory effect, electrochemical metallization memory effect, valence change memory effect, thermochemical memory effect, and phase change memory effect and the like of the resistive random access memory.

The verification standard may include: for the resistive random access memory, Forming voltage: less than 3 V; SET voltage: less than 2 V; RESET voltage: less than 2 V; erasing and writing speed: less than 500 ns; power consumption: no more than $10^{-10}$ pJ; storage window: more than 100; retention characteristics: more than 10,000 times; durability: working time greater than 10 years at 85° C.; on-off ratio: greater than 100; fluctuation of current parameter: greater than 90%; storage density: not less than 1.0 Gbit/cm$^2$.

The overall performances of the resistive random access memories selected in such a way will be better.

In some embodiments, since many resistive random access memories are designed, after the resistive random access memories with better performance are selected, the mapping tables can be supplemented according to corresponding performance feedback information. For example, if the electrostatic/electron memory effect and the electrochemical metallization memory effect of one or several designed resistive random access memories are better, then the corresponding electrode materials can be added in the corresponding mapping tables, because the electrostatic/electron memory effect and electrochemical metallization memory effect of the resistive random access memory are determined by the electrode materials.

As another example, if the valence change memory effect, thermochemical memory effect, and phase change memory effect of one or several designed resistive random access memories are better, then the corresponding dielectric layer material can be added in the corresponding mapping tables, because the valence change memory effect, thermochemical memory effect, and phase change memory effect of the resistive random access memory are determined by the dielectric layer material.

In another aspect, the present disclosure may further provide an apparatus for designing a resistive random access memory. As shown in FIG. 2, the apparatus may include: a searching unit 21, an establishing unit 22, a selecting unit 23, a designing unit 24, and a verifying unit 25.

When designing a resistive random access memory, the resistive switching material will affect the performance of the resistive random access memory. However, since there are various types of resistive switching materials, it will need great time if every resistive switching material is studied by experimental methods to determine a suitable resistive switching material. In this embodiment, the searching unit 21 may be used to receive a first parameter standard for the resistive switching material, and search for and output the first resistive switching material from the mass materials by using the high-throughput first-principles calculations method based on the first parameter standard. The first resistive switching materials are resistive switching materials that meet the first parameter standards.

Here, the first-principles calculations method is used to calculate first parameters of each of the materials that may be used as the materials of resistive random access memories respectively based on the first parameter standard, and if the calculated results meet the first parameter standard, the material is outputted as the first resistive switching material. The first parameters mainly include: band gap, charge transfer, vacancy, migration barrier, carrier activation energy, Schottky barrier, and number of mesophase. Correspondingly, the first parameter standard in this embodiment may include: band gap: 1~4 eV, charge transfer: less than 0.5 eV, vacancy: with oxygen vacancy and gap, migration barrier: less than 1 eV, carrier activation energy: less than 1 eV, Schottky barrier: less than 2 eV, number of mesophase: less than 3 types.

After the first resistive switching materials are obtained, since there are a plurality of first resistive switching materials, the establishing unit 22 is configured to establish a resistive switching material database according to the first resistive switching materials so as to shorten the process for designing the resistive random access memory for research and development personnel.

Here, the establishing unit 22 may first establish mapping tables between respective first resistive switching materials and their corresponding first parameter standards respectively. For example, if a first resistive switching material A corresponds to the first parameters of: band gap: 2 eV, charge transfer: 0.3 eV, vacancy: with oxygen vacancy and gap, migration barrier: 0.8 eV, carrier activation energy: 0.9 eV, Schottky barrier: 1 eV, number of mesophase: 2 types, then a mapping table between the material A and these parameters can be established. The same procedures are carried out for other first resistive switching materials, and finally a plurality of mapping tables may be established.

Then, the mapping tables may be respectively stored into corresponding data blocks in the preset database to form the resistive switching material database. That is to say, different data blocks store mapping tables of different first resistive switching materials and their corresponding first parameter standards, respectively. Of course, all the mapping tables can be stored in the same data region in the database, which is not limited herein.

After the resistive switching material database is established, in order to find resistive switching materials of better performance, the selecting unit 23 is configured to receive a second parameter standard for a resistive random access memory device model, and select a second resistive switching material from the resistive switching material database according to the second parameter standard. The resistive random access memory device models are established according to the first resistive switching materials in the resistive switching material database. There are several resistive random access memory device models, that is, after a plurality of resistive random access memory device models are designed by using the first resistive switching materials, the resistive random access memory device models conforming to the second parameter standards can be selected from the plurality of the resistive random access memory device models; and then the second resistive switching materials used in the selected resistive random access memory device models can be determined.

In some embodiments, the performances of the plurality of resistive random access memory device models may be verified to obtain performance feedback information. The first resistive switching materials used in the resistive random access memory device models with better performance may be retained, and the first resistive switching materials used in the resistive random access memory device models with poor performance may be screened out. Finally, the second resistive switching materials may be contained in the resistive switching material database.

Here, the second parameters may include: Forming voltage, SET voltage, RESET voltage, erasing and writing speed, power consumption, storage window, stability, durability, on-off ratio, fluctuation of current parameter, and storage density of the device model. Correspondingly, for the device model, the second parameter standard may comprise: Forming voltage: less than 5 V; SET voltage: less than 3 V; RESET voltage: less than 3 V; erasing and writing speed: less than 500 ns; power consumption: no more than $10^{-6}$ pJ; storage window: greater than 10; retention characteristics: more than 1000 times; durability: working time greater than 10 years at 85° C.; on-off ratio: greater than 10; fluctuation of current parameter: greater than 80%; storage density: not less than 1.0 Gbit/cm$^2$.

In some embodiments, the fluctuation of current parameter can be determined according to formula (1):

$$\Delta I = \frac{I_{max} - I_{min}}{I_{max}} \times 100\%. \quad (1)$$

In formula (1), $I_{max}$ represents the maximum current of the device model and $I_{min}$ represents the minimum current of the device model.

After the second resistive switching materials are obtained, suitable electrode materials and storage structures can be determined to design the resistive random access memories. The designing unit 24 is configured to design the resistive random access memories by using the second resistive switching materials, the corresponding electrode materials, and predetermined storage structures.

In some embodiments, a top electrode material for the resistive random access memory may include: a single-element electrode such as Ag, Cu, Ni, or an alloy electrode containing at least one of the above elements; a bottom electrode material may include one or more of the following materials: TaN, TiN, W, Al, Ru, Ti and Pt. The storage structure may include a metal-insulator-metal structure or a metal-insulator-semiconductor structure.

After the resistive random access memories are designed, the verifying unit 25 is also required to verify the overall performance of the resistive random access memories according to a preset verification standard, and determine the resistive random access memories that meet requirements and obtain performance feedback information. The performance feedback information may include electrostatic/electron memory effect, electrochemical metallization memory effect, valence change memory effect, thermochemical memory effect and phase change memory effect and the like of the resistive random access memories.

The verification standard for the resistive random access memory device may include: Forming voltage: less than 3 V; SET voltage: less than 2 V; RESET voltage: less than 2 V; erasing and writing speed: less than 500 ns; power consumption: no more than $10^{-10}$ pJ; storage window: more than 100; retention characteristics: more than 10,000 times; durability: working time greater than 10 years at 85° C.; on-off ratio: greater than 100; fluctuation of current parameter: greater than 90%; storage density: not less than 1.0 Gbit/cm$^2$.

The resistive random access memories selected in such way would have better overall performance.

In some embodiments, since many resistive random access memories are designed, after the resistive random access memories with better performance are selected, the establishing unit 22 can be further configured to supplement the mapping tables according to corresponding performance feedback information. For example, if the electrostatic/electron memory effect and the electrochemical metallization memory effect of one or several designed resistive random access memories are better, then the corresponding electrode materials can be added in the corresponding mapping tables, because the electrostatic/electron memory effect and electrochemical metallization memory effect of the resistive random access memory are determined by the electrode material.

As another example, if the valence change memory effect, thermochemical memory effect, and phase change memory effect of one or several designed resistive random access memories are better, then the corresponding dielectric layer material can be added in the corresponding mapping tables, because the valence change memory effect, thermochemical memory effect, and phase change memory effect of the resistive random access memory are determined by the dielectric layer material.

The beneficial effects of the method and apparatus for designing a resistive random access memory according to the present disclosure may include at least one of the following:

The disclosure provides a method and an apparatus for designing a resistive random access memory, and the method may comprise: receiving a preset first parameter standard for a resistive switching material, searching for and outputting the first resistive switching material by using a high-throughput first-principles calculations method based on the first parameter standard, the first parameters comprising: band gap, charge transfer, vacancy, migration barrier, carrier activation energy, Schottky barrier, and number of mesophase; establishing a resistive switching material database according to the first resistive switching materials; receiving a second parameter standard for a resistive random access memory device model, and selecting a second resistive switching material from the resistive switching material database according to the second parameter standard, wherein the resistive random access memory device model is established based on the first resistive switching materials in the resistive switching material database, and the second parameters may comprise: Forming voltage, SET voltage, RESET voltage, erasing and writing speed, power consumption, storage window, stability, durability, on-off ratio, fluctuation of current parameter, and storage density of the device model; designing a resistive random access memory by using the second resistive switching material, corresponding electrode materials, and a predetermined storage structure. In such way, the first resistive switching materials are selected from mass resistive switching materials according to the first parameter standards so as to obtain the first resistive switching materials and establish the resistive switching material database, and the resistive switching materials can be selected from the resistive switching material database to establish the resistive random access memory device models; and then the performance parameter (second parameter) feedback information of the resistive random access memory device models are used to screen out part of the resistive switching materials, therefore the remaining resistive switching materials are the second resistive switching materials with superior performance. Because for the first parameter standards and the second parameter standards all the factors affecting the properties of the resistive switching materials and the resistive random access memories are considered, the overall performance of the resistive random access memories designed by using the selected second resistive switching materials can be guaranteed certainly; and the established resistive switching material database can also be used to provide theoretical guidance for subsequent research and development staff. The design process is shortened and the design efficiency is improved because no complicated experiments are needed to determine the resistive switching materials in the process of designing the resistive random access memory.

The above is only the preferred embodiments of the present invention, and is not intended to limit the scope of the present invention. Any modifications, equivalent substitutions and improvements made within the spirit and principles of the present invention should be included within the scope of protection of the present invention.

The invention claimed is:

1. A method for designing a resistive random access memory, comprising:

receiving a preset first parameter standard for a resistive switching material, and searching for and outputting a first resistive switching material by using a high-throughput first-principles calculations method based on the first parameter standard, wherein first parameters include: band gap, charge transfer, vacancy, migration barrier, carrier activation energy, Schottky barrier and number of mesophase;

establishing a resistive switching material database according to the first resistive switching materials;

receiving a second parameter standard for a resistive random access memory device model, and selecting a second resistive switching material from the resistive switching material database according to the second parameter standard, wherein the resistive random access memory device models are established based on the first resistive switching materials in the resistive switching material database; and second parameters include: Forming voltage, SET voltage, RESET voltage, erasing and writing speed, power consumption, storage window, stability, durability, on-off ratio, fluctuation of current parameter and storage density of the device models; and designing a resistive random access memory by using the second resistive switching material, corresponding electrode material, and a predetermined storage structure, wherein establishing the resistive switching material database according to the first resistive switching materials includes:

establishing mapping tables between various first resistive switching materials and corresponding first parameter standards; and respectively storing the mapping tables in corresponding data blocks in a preset database to form the resistive switching material database.

2. The method according to claim 1, wherein the first parameter standard includes:

band gap: 1~4 eV, charge transfer: less than 0.5 eV, vacancy: with oxygen vacancy and gap, migration barrier: less than 1 eV, carrier activation energy: less than 1 eV, Schottky barrier: less than 2 eV, and number of mesophase: less than 3 types.

3. The method according to claim 1, wherein the second parameter standard includes: for the device model, Forming voltage: less than 5 V; SET voltage: less than 3 V; RESET voltage: less than 3 V; erasing and writing speed: less than 500 ns; power consumption: no more than 10-6 pJ; storage window: greater than 10; retention characteristics: more than 1000 times; durability: working time greater than 10 years at 85° C.; on-off ratio: greater than 10; fluctuation of current parameter: greater than 80%; storage density: not less than 1.0 Gbit/cm2.

4. The method according to claim 1, wherein the selecting the second resistive switching material from the resistive switching material database according to the second parameter standard comprises:

selecting the resistive random access memory device model conforming to the second parameter standard from a plurality of the resistive random access memory device models; and determining second resistive switching materials used in the selected resistive random access memory device models.

5. The method according to claim 1, wherein after the designing the resistive random access memory by using the second resistive switching material, corresponding electrode material, and the predetermined storage structure, the method further comprises:

verifying an overall performance of the resistive random access memory according to a preset verification standard.

6. An apparatus for designing a resistive random access memory, comprising:

a searching unit, configured to receive a preset first parameter standard for a resistive switching material, and search for and outputting a first resistive switching material according to the first parameter standard, wherein first parameters include: band gap, charge transfer, vacancy, migration barrier, carrier activation energy, Schottky barrier and number of mesophase;

an establishing unit configured to establish a resistive switching material database according to the first resistive switching materials;

a selecting unit, configured to receive a second parameter standard for a resistive random access memory device model, and selecting a second resistive switching material from the resistive switching material database according to the second parameter standard, wherein the resistive random access memory device models are established based on the first resistive switching materials in the resistive switching material database; and second parameters include: Forming voltage, SET voltage, RESET voltage, erasing and writing speed, power consumption, storage window, stability, durability, on-off ratio, fluctuation of current parameter and storage density of the device models; and a designing unit, configured to design a resistive random access memory by using the second resistive switching material, corresponding electrode material, and a predetermined storage structure, wherein the establishing unit is configured to:

establish mapping tables between various first resistive switching materials and corresponding first parameter standards; and respectively store the mapping tables in corresponding data blocks in a preset database to form the resistive switching material database.

7. The device according to claim 6, wherein the selecting unit is specifically configured to:

select the resistive random access memory device model conforming to the second parameter standard from a plurality of the resistive random access memory device models; and determine second resistive switching materials used in the selected resistive random access memory device models.

8. The device according to claim 6, further comprising:

a verifying unit, specifically configured to verify an overall performance of the resistive random access memory according to a preset verification standard, after the resistive random access memory is designed by using the second resistive switching material, corresponding electrode material, and the predetermined storage structure.

* * * * *